Jan. 7, 1941. P. VAN VLECK 2,227,802
AUTOMATIC TIRE PRESSURE SWITCH
Original Filed Dec. 7, 1936
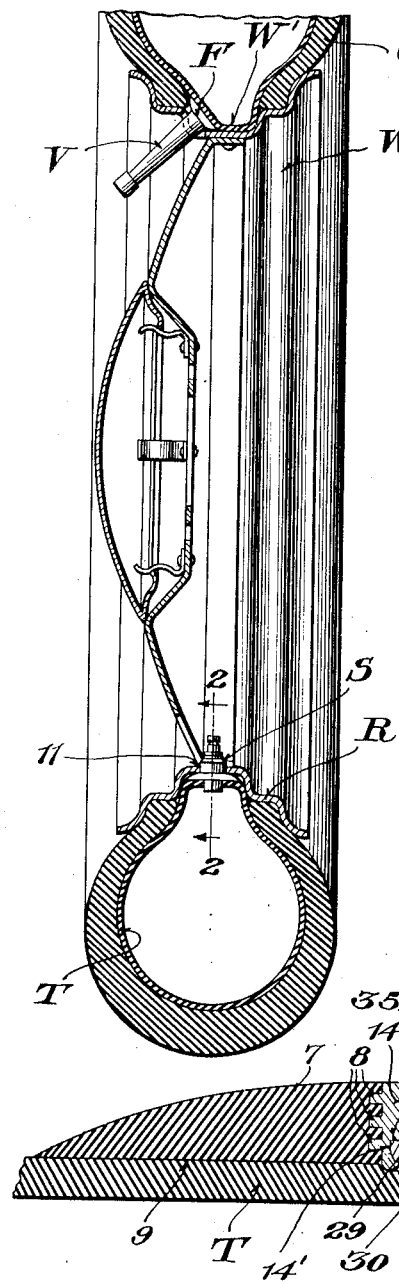
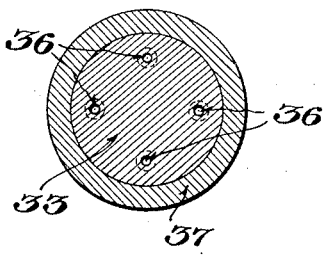
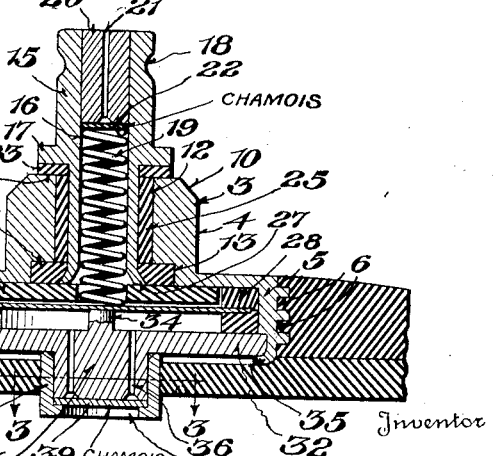
Inventor
Peirce van Vleck,
By Andrew T. Dupont
his Attorney Patented Jan. 7, 1941

2,227,802

UNITED STATES PATENT OFFICE 2,227,802

AUTOMATIC TIRE PRESSURE SWITCH

Peirce van Vleck, Greenville, S. C.

Substituted for abandoned application Serial No. 114,677, December 7, 1936. This application July 10, 1939, Serial No. 283,713

6 Claims. (Cl. 200—58)

My invention relates to an automatic tire pressure switch adapted to cooperate with certain electrical means, whereby a driver of a motor vehicle may be apprised of the fact that a tire has become deflated to a point where it would be dangerous or uneconomical to continue to drive the vehicle with such low pressure in one or more of the tires.

Among the objects of my invention is the provision of a thin diaphragm constituting a switch element which may be used on any pneumatic tire wheel structure or similar fluid pressure vessel, for the purpose of completing an electric circuit when the pressure diminishes below a predetermined minimum.

Another object of my invention consists in providing a switch of the kind referred to, which will not interfere with the usual methods of tire inflation or with the mounting of the tire upon the rim, which is self contained, compact, inconspicuous, and may be concealed from view.

A further object of my invention lies in the provision of such a mounting for the switch on the tire that it will prevent the entrance of moisture and foreign matter within the interior of the tire casing, which will be durable, reliable, and will not require further adjustment after its initial assembly, and which cannot be readily tampered with; which will be of extremely light weight so as not to offset the kinetic balance of the wheel, as well as sensitive to the highest degree.

Still another object of my invention consists in providing an electric switch whose construction and mounting permit the entire switch structure to be drawn into the well of drop center tire rims upon deflation of the tire while the wheel is in motion, so that tearing of the inner tube will be prevented, as well as prevent "creeping" of the partially deflated tire upon the rim.

These and other objects of the invention will be more fully and clearly described in the following specification and accompanying drawing, and more particularly set forth in the appended claims.

In the drawing,

Figure 1 is a cross section through a wheel showing my automatic tire pressure switch attached to the same;

Figure 2 is an enlarged section on line 2—2 of Figure 1, illustrating my new and improved switch construction; and, Figure 3 is an enlarged section on line 3—3 of Figure 2.

Referring to the drawing more in detail, a wheel W, which may be either of the disc or artillery-disc type, is shown, the same being provided with a drop center rim R upon which is mounted the usual tire casing C containing an inner tube T. The latter is provided with the customary inflating valve V, which is rubber covered and has a depending flange portion F by means of which it is secured to the inner tube T.

Centrally of the rim and within the well W' thereof is mounted my improved switch designated generally at S. It will be noted that the location of the switch is 180 degrees from the inflating valve V, the purpose of this arrangement being to provide an effective static as well as kinetic balance between the parts.

The switch S comprises a metallic casing 3 having stepped cylindrical portions 4 and 5, the latter of which is provided with circumferential grooves 6 so that a rubber base 7 may be cast about the cylindrical portion 5 and be securely retained in said grooves 6.

The general outward appearance of the rubber flange 7 is identical with that of the rubber flange F of the inflating valve V.

The fins 8, outlining the grooves 6, also serve the purpose of strengthening the case against internal fluid pressure, adding rigidity and strength to the side walls thereof and, together with the grooves 6, provide additional surface for the adhesion of the rubber base or flange 7.

As shown in Figure 2, this flange 7 has an under face 9 by means of which it is adapted to be placed in sealed contact with the outer wall of the inner tube T.

This sealing may be accomplished either by cold cementing or by heat curing, after the manner of attaching rubber valve stems to inner tubes. The flange 7 serves the additional purpose of preventing entrance of moisture and foreign matter in the interior of the tire casing.

The cylindrical portion 4 of the casing 3 is tapered, as shown at 10, to permit its insertion in an opening 11 of the rim R, the fit of the slightly tapered portion 4 in this opening being such as to prevent the entrance of water or grit between the parts. The provision of the taper 4 also permits the easy removal of the device and allows the switch assembly to be drawn into the rim upon deflation of the tire. In this manner, tearing of the inner tube is prevented, while the wheel is in motion.

As shown in Figure 2, casing 3 has an axial opening therein comprising four aligned bores 12, 13, 14 and 14'. Within the bore 12 is mounted a hollow metallic sleeve 15, having an axial opening 16 therein and an external flange 17. At its upper portion, the sleeve 15 is provided with an annular groove 18 adapted to receive a female snap electric connector (not shown). A spring 19 is housed in the lower end of the opening 16 of the sleeve 15 and a metallic plug 20 has a push fit in the upper portion of the opening 16. A small passage 21 is drilled axially of the plug 20. This plug 20 serves to tension the spring 19, and the purpose of the passage 21 is to vent any pressure fluid, which might accumulate in the opening 16. The size of the passage 21 is such that, although it will relieve pressure, it is too small to admit liquid. A small disc of chamois 22 is interposed between the lower end of the plug 20 and the adjacent abutting end of the spring 19.

An insulating washer 23 is interposed between flange 17 of sleeve 15 and the face 24 of casing 3, and an insulating tube 25 is located within the bore 12 of the casing and is telescoped by the lower portion of sleeve 15. Within the bore 13 of the casing 3 is located another insulating washer 26 having a central circular opening to accommodate the lower end of the sleeve 15, and it will be noted that the lower edge of this sleeve is expanded or upset outwardly, as shown at 27, for the purpose of providing a secure and rigid assembly of the insulating washer 23, insulating tube 25 and insulating washer 26 within the casing 3.

Within the bore 14 of casing 3 is provided a pair of fiber insulating, pressure tight, gaskets 28 and 29, respectively, and between the said gaskets is mounted a thin, metallic diaphragm 30. In stamping the diaphragm 30 out of the metal strip there is produced a slight dependent peripheral flange or lip, which flange or lip embeds itself in either gasket 28 or 29, depending on which way the diaphragm faces when the device is squeezed together in assembly, in such manner as to prevent movement or slippage of the diaphragm. A dielectric limit stop element 31 is placed directly above diaphragm 30 within gasket 28. The object of this stop element 31 is to prevent diaphragm 30 from exceeding its limit of strength and elasticity, which might be caused by an excess of fluid pressure. Stop element 31, preferably, has its side towards the diaphragm 30 concavely cut in a geometric curve, which will coincide with the curvature which the diaphragm assumes at the predetermined pressure at which it is desired to have the diaphragm limited in its deflection.

An alternate way in which practically the same result may be obtained is to fill the space between the diaphragm 30 and the upper adjacent portion of casing 3 with air hardening porcelain, and then deflect the diaphragm to the desired degree by admitting fluid pressure against its under side and maintaining this pressure, at the required degree, until the porcelain sets.

While both of the above methods are indicated as desirable to produce the most accurate results and are preferably used in the practice of my invention in order to obtain these accurate results, it is possible, for practical purposes, to use a flat disc, for the stop element, having substantially parallel sides. Obviously, such means provides structural support against predetermined excess pressures to prevent exceeding the ultimate strength and elastic limit of the movable element and thus preserve "zeroing" characteristics of the diaphragm by supporting the latter over practically its entire area.

A metallic cover plate 32, having integrally therewith a depending cylindrical solid portion 33 and at the opposite end thereof a contact point or stud 34 in close proximity to the diaphragm 30, is fitted within the bore 14' of casing 3, retaining the parts within the case in operative assembly. The lower edge of casing 3 is stamped over inwardly to form a shoulder 35, while shoulder 35' formed on bore 14 serves to definitely limit the amount of pressure which can be exerted against the cover plate 32 to position the gaskets 28 and 29, as well as diaphragm 30. This feature is very important, as the fixed contact 34 of the cover plate 32 must be in exact relationship with the diaphragm 30, when the parts are assembled and the whole device locked together.

It will be noted that the depending cylindrical portion 33 of the cover 32 is provided with through ports 36, which permit the passage of the air from within the tire to the under side of diaphragm 30.

The portion 33 of the cover 32 is received within a metal cap 37 whose lower wall has an opening 38 therethrough and a filtering disc 39, of chamois or the like, is fitted between the cap 37 and the cylindrical portion 33 of the cover. In this manner, the contact point 34 and the diaphragm 30 are protected against rubber, talc, and other foreign matter which might interfere with the successful operation of the switch.

In operation, contact point 34 forms part of an electrical circuit which is opened by the space separating it from the diaphragm 30. The spring 19 serves the dual purpose of completing the electric circuit between the head or casing 3 and the diaphragm 30 by closing the gap between the diaphragm 30 and the fixed contact 34, and of absorbing the fluid pressure of the tire. It is obvious that the spring 19 need only exert sufficient pressure to complete the circuit between the casing 3 and the diaphragm 30, the inherent spring quality of the diaphragm being used solely to balance the fluid pressure in the tire. The upper part of the casing 3 is connected to the remaining portion of the electric circuit which includes visual or audible means, or both, which become operative or inoperative whenever the circuit is closed or opened between contact point 34 and diaphragm 30, depending on the pressure acting against the diaphragm.

It has not been thought necessary to illustrate the complete electrical circuit, inasmuch as such circuits are shown in the art, and for which reference is made to the U. S. Patent No. 1,117,329.

The contact point 34 and the side of the diaphragm which is in communication with the fluid pressure in the inner tube are preferably coated or plated with platinum, gold, tin, or nickel, or other metal resistant to the corrosive action of the sulphur compounds combined with water vapor usually present in rubber tires. It is obvious that it need only be necessary to provide that portion of the diaphragm which comes in contact with the contact point 34 with a "spot" of the non-corrosive substance, or substance, such as nickel, which, when it oxidizes or forms sulphides, will have no injurious effects upon the conductivity between the contact points.

The purpose of the chamois disc 22 between the spring 19 and the plug 20 is to preclude the entrance of foreign matter while permitting communication of the low pressure side of the switch with the atmosphere through port 21.

It is pointed out that by positioning the automatic tire pressure switch on the tire and wheel structures in the manner shown, the outward ornamental decorative appearance of wire, disc and disc-spoke wheels, which are frequently gayly painted and striped or elaborately chromium plated, is preserved.

Furthermore, the location of my switch presents a minimum "windage" at high speeds. It is practically concealed from view, being on the car side of a disc wheel or behind a spoke section of an imitation artillery-disc wheel. It is also protected from skid chains, stones, mud, ice, snow and curb scuffing.

A further important feature of my invention consists in that the material of which diaphragm 30 is made is so chosen as to possess a coefficient of expansion approximately the same as that of casing 3, so as to maintain a proper ratio between these elements when subjected to contraction and expansion due to temperature changes.

I am aware that this disclosure will readily suggest modified constructions and combinations of parts within the spirit of this invention, and I, therefore, do not limit myself to the use of the specific embodiment shown, but claim all modifications fairly within the scope of the appended claims.

What I claim is:

1. In combination with a wheel, a pneumatic tire carried thereby, a switch operated by the pressure within the air chamber of said pneumatic tire, and means for securing said switch to the air chamber, said means comprising a rubber base carried by said switch and adapted to be cemented to the wall of the air chamber.

2. A pressure operated switch comprising a hollow casing, a sleeve therein and carried thereby, means for insulating said sleeve from said casing, a diaphragm within said casing, means for insulating said diaphragm from said casing, a cover for said casing, a contact member carried thereby, a spring in said sleeve bearing against said diaphragm and forming part of the electrical circuit, said cover having openings therethrough to permit passage of fluid pressure to one side of the diaphragm.

3. A pressure operated switch comprising a hollow casing, a sleeve therein and carried thereby, means for insulating said sleeve from said casing, a bushing carried within the sleeve at one end thereof, said bushing having a vent therethrough, a diaphragm within said casing, means for insulating said diaphragm from said casing, a cover for said casing, a contact member carried thereby, a spring in said sleeve bearing against said diaphragm, said cover having openings therethrough to permit passage of fluid pressure to one side of the diaphragm, and filtering means for the aforementioned vent and openings.

4. A pressure operated switch comprising a casing, a diaphragm therein forming a movable contact member, a fixed contact carried in said casing, means for permitting pressure fluid to act against one side of said diaphragm, and means for venting the opposite side of said diaphragm.

5. A pressure operated switch comprising a hollow casing, a sleeve therein and carried thereby, means for insulating said sleeve from said casing, contacts in said casing for controlling an electric circuit, a cover for said casing, said cover carrying one of said contacts, means on said casing for securing said cover within said casing, and a shoulder on said casing serving as an abutment for said cover, whereby to align said contacts in operative relation.

6. A pressure operated switch comprising a hollow casing, a sleeve therein and carried thereby, means for insulating said sleeve from said casing, contact means in said casing for controlling an electric circuit, a cover for said casing secured to the latter, a cylindrical depending extension on said cover having openings therethrough, a filtering member covering said openings, and an open ended cooperating bushing about said cylindrical portion, maintaining said filtering member in operative position.

PEIRCE van VLECK.